United States Patent [19]
Rozman et al.

[11] Patent Number: 5,438,502
[45] Date of Patent: Aug. 1, 1995

[54] VSCF SYSTEM WITH VOLTAGE ESTIMATION

[76] Inventors: Gregory I. Rozman; John Risley, boyh of P.O. Box 7003, Rockford, Ill. 61125-7003

[21] Appl. No.: 995,472

[22] Filed: Dec. 22, 1992

[51] Int. Cl.6 .................................................. H02J 3/36
[52] U.S. Cl. .......................................... 363/35; 363/97; 363/131; 363/79
[58] Field of Search ................... 363/35, 37, 41, 97, 363/98, 131, 132, 74, 78, 79, 80; 322/17, 28

[56] References Cited

U.S. PATENT DOCUMENTS

| | | | |
|---|---|---|---|
| 4,442,396 | 4/1984 | Hucker | 322/21 |
| 4,554,501 | 11/1985 | Baker | 322/29 |
| 4,622,629 | 11/1986 | Glennon | 363/70 |
| 4,937,723 | 6/1990 | Rozman et al. | 363/51 |
| 4,956,598 | 9/1990 | Recker et al. | 322/28 |
| 5,047,699 | 9/1991 | Rozman et al. | 318/254 |
| 5,138,543 | 8/1992 | Harm et al. | 363/97 X |

Primary Examiner—Steven L. Stephan
Assistant Examiner—Y. Jessica Han

[57] ABSTRACT

A voltage estimator for a generating system having a DC link and an inverter detects the magnitudes of the voltage and current on the DC link and develops an estimate signal representing the estimated magnitude of a fundamental component of output voltage developed by the inverter from the sensed DC voltage and current magnitudes.

21 Claims, 2 Drawing Sheets

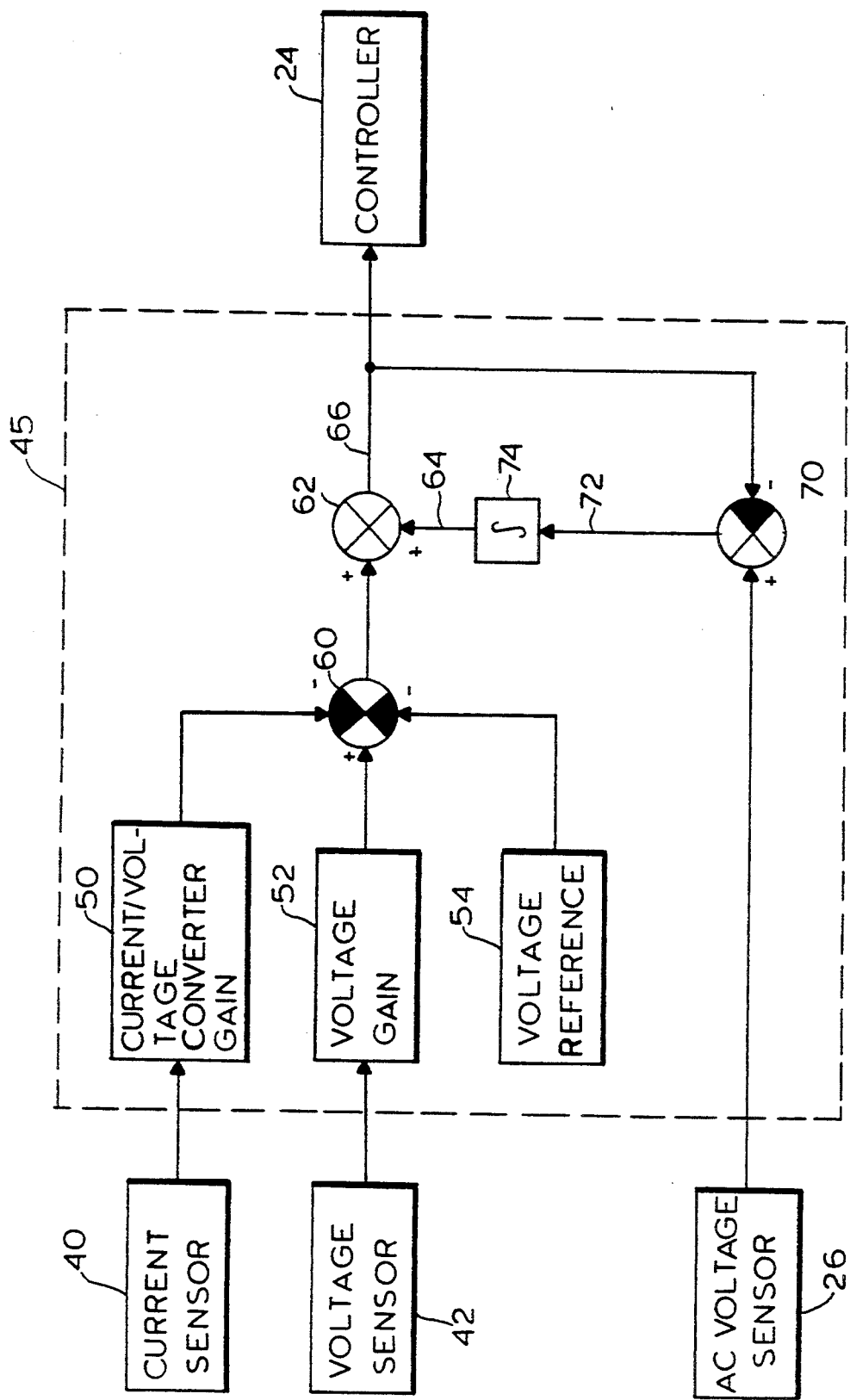

VSCF SYSTEM WITH VOLTAGE ESTIMATION

TECHNICAL FIELD

The present invention relates generally to power generating systems, and more particularly to a control for a variable-speed, constant-frequency (VSCF) power generating system.

BACKGROUND ART

In a VSCF power generating system, a generator is supplied variable-speed motive power by a prime mover, such as an aircraft engine, and develops variable-frequency AC power at an output thereof. The variable-frequency power is rectified and provided over a DC link conductor to a controllable inverter. The inverter is operated to produce constant-frequency AC power, which is then supplied over a load bus to one or more loads. A control unit controls the excitation of the generator or the inverter or both in order to regulate the output of the generating system. Such a control is disclosed in Rozman, et al., U.S. Pat. No. 4,937,723. A control of this type must be used in conjunction with, for example, an AC voltage detector to sense the output voltage of the VSCF system at a point of regulation (POR) in order to regulate the output voltage. The VSCF system requires the use of an AC voltage detector having fast response characteristics for improved transient performance. Currently the AC voltage detector is implemented with a rectifier and a filter. This filter slows down the transient response of the detector resulting in poor system performance.

Other patents disclosing controls for VSCF power supply systems wherein generator excitation is controlled in accordance with one or more sensed parameters include Hucker, U.S. Pat. No. 4,442,396 and Glennon, U.S. Pat. No. 4,622,629.

Rozman, et al., U.S. Pat. No. 5,047,699 discloses a VSCF system which is operable in generating and starting modes. When the VSCF system is operating in a starting mode, input power is provided to a rectifier and inverter of the VSCF system, which in turn operate a brushless generator as a motor to provide motive starting power. A motor current estimator is operative during the starting mode of operation to estimate the current flowing in the generator armature windings. The current estimator is responsive to an input power signal representing the input power provided by an external source during operation in the starting mode, a rotor position signal and a commutation angle command signal.

SUMMARY OF THE INVENTION

In accordance with one aspect of the present invention, a VSCF generating system includes means for estimating a parameter of the output power produced by the system and a control unit responsive to the estimating means for controlling the generating system. In this system the control unit is capable of responding more quickly to transients appearing at the generating system output than other systems.

More particularly, an improvement in a generating system producing an output waveform wherein the generating system includes a generator, a rectifier, a DC link coupled to an inverter and a control unit for controlling the generating system includes means for sensing a parameter of power on the DC link and means coupled to the sensing means and responsive to the parameter of power on the DC link for developing an estimate signal representing an estimated magnitude of the parameter of the output waveform wherein the control unit is responsive to the estimate signal.

Preferably, the sensing means includes a first parameter sensor and a second parameter sensor that develop a first parameter signal and a second parameter signal representing a first parameter magnitude and a second parameter magnitude on the DC link.

Also, preferably, the developing means includes first and second gain units coupled to the first and second parameter sensors, respectively, wherein the gain units develop scaled versions of the first parameter signal and the second parameter signal. The developing means may further include means coupled to the gain units for combining the scaled versions of the first parameter signal and the second parameter signal.

Still further according to this aspect of the present invention, the combining means preferably comprises a summer that subtracts the scaled version of the first parameter signal from the scaled version of the second parameter signal.

Also preferably, the developing means further includes means for generating an operational parameter signal representing an operational parameter of the inverter and wherein the combining means combines the operational parameter signal with the scaled versions of the first and second parameter signals. According to this aspect of the present invention, the operational parameter signal represents losses in the inverter during operation thereof.

According to a highly preferred form of the present invention, the developing means further includes means for deriving a correction signal representing a correction to the estimate signal wherein the combining means combines a correction signal with the scaled versions of the first and second parameter signals to derive the estimate signal. According to this aspect of the present invention, the deriving means may preferably include means responsive to the estimate signal and a signal representing an actual magnitude of the output waveform for producing an error signal. An integrator may be coupled to the producing means which in turn develops the correction signal. The actual magnitude of the output waveform represents the average of phase voltages developed by the inverter.

According to another aspect of the present invention, a voltage estimator for a generating system that produces an output voltage wherein the output voltage includes a fundamental component at a fundamental frequency and an additional component at a frequency other than the fundamental frequency and wherein the generating system includes a source of DC power producing DC voltage and current on a DC link and a DC/AC converter coupled to the DC link that develops the output voltage includes first and second means for sensing the DC voltage and current on the DC link and means coupled to the first and second sensing means responsive to the sensed DC voltage and current for developing an estimate signal representing the estimated magnitude of the fundamental component of the output voltage.

The present invention permits fast detection of the output voltage of an inverter in a simple and effective fashion.

BRIEF DESCRIPTION OF THE DRAWINGS

FIG. 3 is a block diagram of the voltage estimator of FIG. 2.

DESCRIPTION OF THE PREFERRED EMBODIMENT

Figure 1:
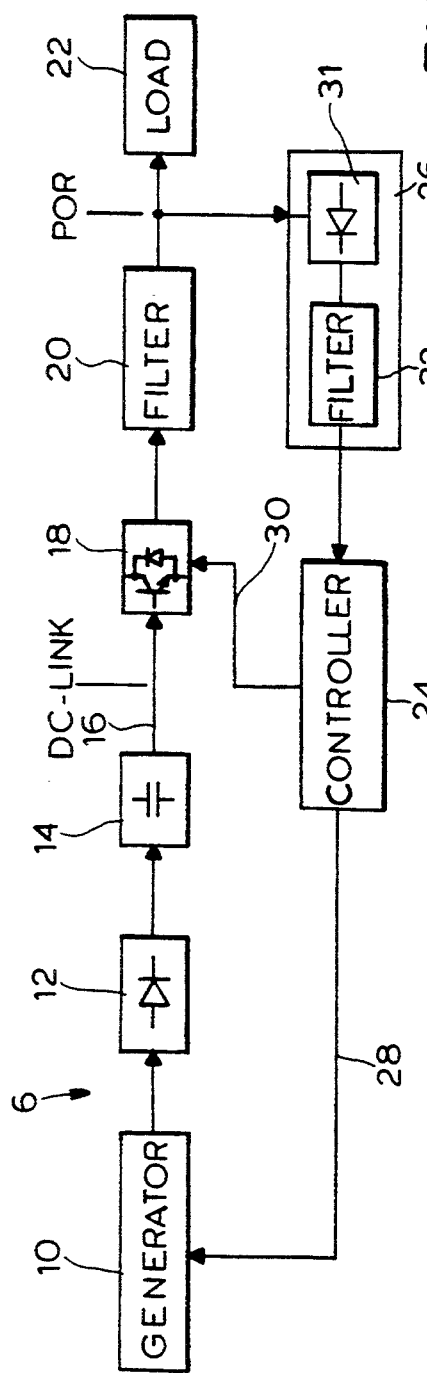
FIG. 1 is a block diagram of a prior art power generating system.

Referring now to FIG. 1, a prior art VSCF system 6 is shown. A generator 10, driven by a prime mover (not shown), such as an aircraft jet engine, produces variable-frequency AC power at an output thereof. A rectifier 12 rectifies the variable-frequency power and, in conjunction with a filter 14, produces DC voltage and current on a DC link 16 including conductors 16a–16b. The DC link 16 is coupled to an inverter 18 which produces polyphase, constant-frequency AC output power. A filter 20 filters the constant-frequency power and the filtered power is supplied to one or more loads 22.

The prior art VSCF system 6 shown in FIG. 1 further includes a controller 24 which regulates the output of the system. The controller 24 is responsive to an average output voltage signal produced by an AC voltage detector 26 having a rectifier 31 serially connected to a filter 32 which measures the average magnitude of the three-phase voltages appearing at the POR. The controller 24 produces signals on lines 28, 30 to control the excitation of the generator 10 and/or the switching sequence of the inverter 18. In this fashion, the controller 24 is able to correct variations in the voltages developed at the generating system output.

Typically, the output of the AC voltage detector 26 includes a DC component proportional to the average voltage at the POR, a fundamental frequency (400 Hz) component and a third harmonic (1200 Hz) component. The ripple from the AC voltage detector 26 interacts with the control algorithm of the controller 24 effectively causing controller gain reduction. In balanced load conditions the third harmonic component is dominant with the filter 32 designed to reduce this ripple. In unbalanced load conditions, however, the fundamental ripple component may be of a significant value so as to require extra filtering. Such filtering adds additional phase lag that limits the transient performance of the VSCF system.

Figure 2:
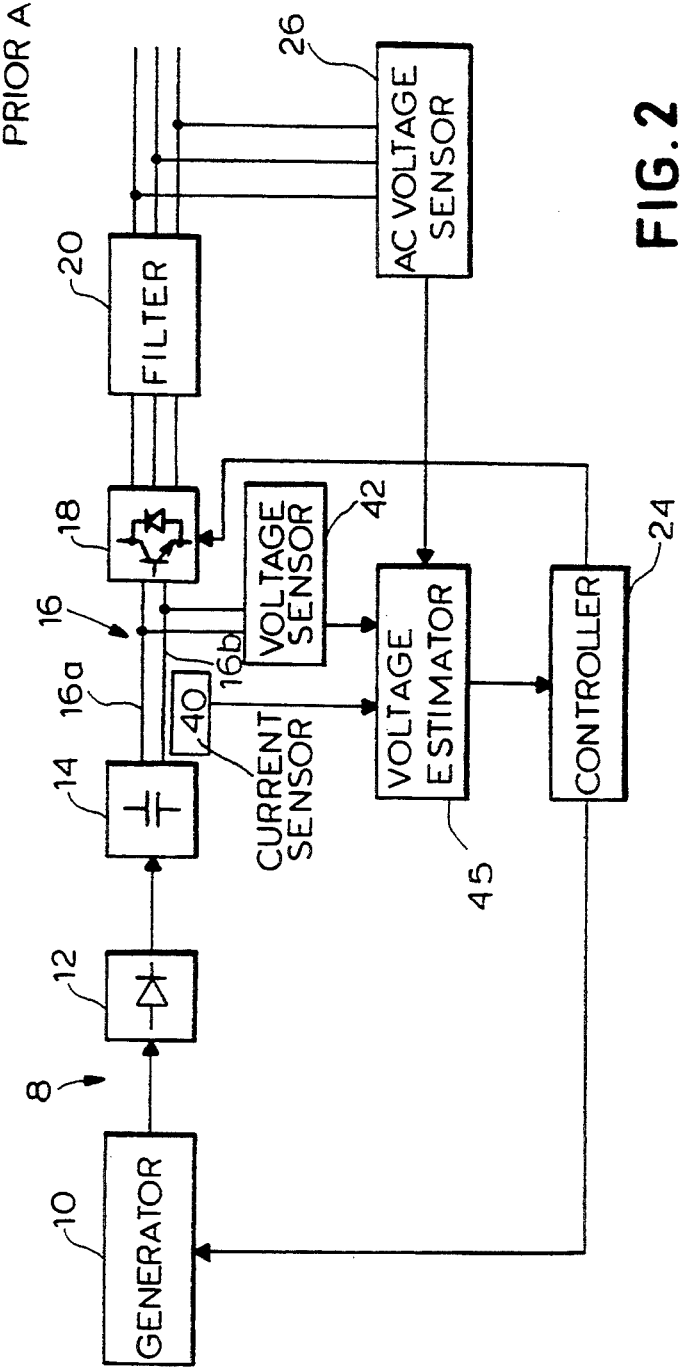
FIG. 2 is a block diagram of a power generating system including a voltage estimator circuit according to the present invention.

Referring now to FIG. 2, a VSCF generating system 8 having an improvement according to the present invention over the prior art system of FIG. 1 is shown. Components identical to those described in connection with FIG. 1 are numbered in a like manner. The improvement of FIG. 2 senses a parameter of power on the DC link and develops an estimator signal representing an estimate of the magnitude of the output of the system 8. More particularly, the improvement comprises the addition of a current sensor 40, a voltage sensor 42 and a voltage estimator 45. The current sensor 40 develops a first parameter signal representing the magnitude of current flowing through one of the DC link conductors 16a, 16b and supplies this signal to a first input of the voltage estimator 45. The voltage sensor 42 develops a second parameter signal representing the voltage appearing across the DC link conductors 16a, 16b and supplies such signal to a second input of the voltage estimator 45. The voltage sensor 42 could instead detect the voltage on one of the conductors relative to a reference, if desired. The AC voltage detector 26 supplies a signal representing the average of the three-phase voltages appearing at the output of the filter 20 to a third input of the voltage estimator 45.

The voltage estimator 45 estimates the average of the three phase voltages appearing at the output of the inverter 18 and produces an estimate signal $V_{AVE}$ representative of this estimated average voltage. The controller 24 is responsive to this voltage estimate signal and produces signals which control the excitation of the generator 10 and the switching of the inverter 18 so that the average voltage at the POR can be regulated at a predetermined level.

The voltage estimator 45 develops the estimate signal according to the equation below:

$$V_{AVE} = V_{DC} \cdot K_{TV} - I_{DC} \cdot R_i - V_C$$

where:
  $V_{DC}$ = Sensed DC link voltage
  $I_{DC}$ = Sensed DC link current
  $K_{TV}$ = Inverter DC to AC voltage transformation coefficient; (0.427)
  $R_i$ = Inverter resistance; (0.03)
  $V_C$ = Operational parameter representing the voltage drop from the DC link voltage to the AC inverter output voltage; (2.0)

(Approximate typical values are indicated parenthetically.)

Thus, the estimate signal produced by the voltage estimator 45 is equal to the DC voltage appearing on the DC link 16 multiplied by the inverter DC to AC voltage transformation coefficient minus voltages representative of losses produced in the inverter.

Referring now to FIG. 3, a preferred embodiment of the voltage estimator 45 is shown. The voltage estimator 45 may be implemented in software, hardware or a combination of the two, as desired. A current/voltage converter gain unit 50 receives the first parameter signal representing the DC current on the DC link 16 from the current sensor 40 and multiplies this signal by the inverter resistance $R_i$ to produce a voltage signal representing the inverter conduction losses. This voltage signal is applied to an inverting input of a summer 60. Likewise, a voltage gain unit 52 receives a signal representing the voltage across the DC link conductors 16a, 16b from the voltage sensor 42 and multiplies this signal by the inverter DC to AC voltage transformation coefficient $K_{TV}$ and supplies this signal to a noninverting input of the summer 60.

A voltage reference 54 produces a signal indicative of the voltage drop $V_C$ in the inverter caused by the inverter switching losses and provides this signal to a second inverting input of the summer 60. The output of the summer 60 represents the average voltage estimate signal produced according to the equation set out above.

It should be noted that the $K_{TV}$ and $R_i$ values may be measured before operation and set to a constant level. Alternatively, these values can be varied during operation based upon measurements obtained in a continuous or periodic manner. Likewise, the voltage reference 54 can be either set to a predetermined value or may be updated according to continuous or periodic measurement of the switching losses in the inverter.

While the output of the summer 60 is a signal that equals the actual average voltage produced by the inverter 18, it should be noted that errors will typically arise in the signal due to power factor variations and system component drift. A correction feedback loop is included in the voltage estimator 45 to cause the average voltage estimate signal to more closely match the actual average voltage produced by the inverter 18.

The output of the summer 60 is combined by a summer 62 with a correction signal appearing on a line 64 to produce a corrected average voltage estimate signal. This corrected average voltage estimate signal is provided on a line 66 controller 24. To derive the correction signal, a summer 70 subtracts the corrected average voltage estimate signal appearing on the line 66 from the signal representing the actual average voltage as detected by the average voltage detector 26 with to produce an error signal indicative of the error between the corrected average voltage estimate signal and the actual average voltage signal. This error signal is provided on a line 72 to an integrator 74 to produce the correction signal.

It should be noted that the summer 60 and the summer 62 can be replaced by a single summer combining the outputs of the current/voltage converter gain unit 50, the voltage gain unit 52, the voltage reference 54 and the integrator 74 to achieve the same result.

The advantage of the voltage estimator 45 is that it predicts POR average voltage from DC link voltage and current measurements without a significant phase lag. Therefore, the controller 24 can react to POR voltage variations much more quickly than prior art circuits.

It should be noted that the present invention is not limited to use with VSCF systems or systems developing polyphase output power. In fact, the present invention can be used with any system that converts DC power produced by any DC source into AC power, whether single-phase or polyphase. In the case of a single-phase system, the AC voltage sensor 26 would be replaced by a voltage sensor capable of detecting the magnitude of the single-phase output.

In addition to the foregoing, one or more parameters other than the DC link voltage and current may be sensed and used to develop an estimate of a parameter of the system output, such as system average output power, average output current, phase power, phase current, phase voltage or the like.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An AC electric power generating system producing an AC output waveform comprising:

a source of DC power;

a DC-to-AC power inverter having a DC input and an AC output, said DC-to-AC power inverter comprising switching means for switchably coupling said DC input to said AC output producing said AC output waveform thereby;

a control unit for controlling said DC-to-AC power inverter;

a DC link conductor electrically connecting said source of DC power and said DC-to-AC power inverter DC input, said DC-to-AC power inverter converting said DC power to AC power and producing said AC output waveform at said inverter output;

means for sensing a parameter of DC power on the DC link conductor;

means coupled to the DC sensing means and responsive to the parameter of DC power on the DC link conductor for developing an estimate signal representing an estimated magnitude of the AC output waveform;

means for providing a direct feed back of a parameter of said AC output waveform; and means directly coupled to said feed back means and responsive to said estimate signal for deriving a correction signal representing a correction to said estimate signal, and wherein said control unit is responsive to said estimate signal.

2. The generating system of claim 1, wherein the sensing means includes a first parameter sensor and a second parameter sensor that develop a first parameter signal and a second parameter signal representing a first parameter magnitude and a second parameter magnitude on the DC link conductor.

3. The generating system of claim 2, wherein the developing means includes first and second gain units coupled to the first and second parameter sensors, respectively, which develop scaled versions of the first parameter signal and the second parameter signal.

4. The generating system of claim 3, wherein the developing means further includes means coupled to the gain units for combining the scaled versions of the first parameter signal and the second parameter signal.

5. The generating system of claim 4, wherein the combining means comprises a summer that subtracts the scaled version of the first parameter signal from the scaled version of the second parameter signal.

6. The generating system of claim 4, wherein the developing means further includes means for generating an operational parameter signal representing an operational parameter of the inverter and wherein the combining means combines the operational parameter signal with the scaled versions of the first and second parameter signals.

7. The generating system of claim 6, wherein the operational parameter signal represents losses in the inverter during operation thereof.

8. The generating system of claim 4, wherein the developing means wherein the combining means combines the correction signal with the scaled versions of the first and second parameter signals to derive the estimate signal.

9. The generating system of claim 8, wherein said parameter of said AC output waveform comprises a signal representing an actual magnitude of the AC output waveform.

10. The generating system of claim 9, wherein the deriving means further includes an integrator coupled to the producing means wherein the integrator develops the correction signal.

11. The generating system of claim 9, wherein the actual magnitude of the output waveform represents the average of the AC voltages.

12. The generating system of claim 9, wherein the producing means comprises a summer that subtracts the estimate signal from the actual magnitude signal.

13. The generating system of claim 2, wherein the first parameter sensor and the second parameter sensor comprise a current and a voltage sensor, respectively.

14. A voltage estimator for an AC electric power generating system that produces an AC output voltage wherein the AC output voltage includes a fundamental component at a fundamental frequency and an additional component at a frequency other than the fundamental frequency and wherein the AC electric power generating system includes a source of DC power producing DC current and voltage on a DC link and a DC-to-AC power inverter that produces the AC output voltage comprising:
  first and second means for sensing the DC voltage and current on the DC link;
  means for providing a direct feed back of the AC output voltage;
  first and second means coupled to the first and second DC sensing means and responsive to the sensed DC current and DC voltage for developing an estimate signal representing the estimated magnitude of the fundamental component of the AC output voltage; and
  means directly coupled to said feed back means and responsive to said estimate signal for deriving a correction signal representing a correction to said estimate signal.

15. The estimator of claim 14, wherein the developing means includes first and second gain units coupled to the first and second sensing means, respectively, which develop first and second scaled DC voltage signals, respectively.

16. The estimator of claim 15, wherein the developing means further includes means coupled to the first and second gain units for combining the first and second scaled DC voltage signals.

17. The estimator of claim 16, wherein the combining means comprises a summer that subtracts the first scaled DC voltage signal from the second scaled DC voltage signal.

18. The estimator of claim 15, wherein the developing means further includes means for generating a loss signal representing losses in the DC-to-AC power inverter during operation thereof wherein the combining means combines the loss signal with the first and second scaled DC voltage signals.

19. The estimator of claim 18, wherein the combining means further combines the correction signal with the first and second scaled DC voltage signal.

20. The estimator of claim 19, wherein the DC-to-AC power inverter develops polyphase output voltages and wherein said direct feed back means produces a signal representing an average of the polyphase output voltages for producing an error signal.

21. The estimator of claim 20, wherein the deriving means further includes an integrator coupled to the producing means.

* * * * *